Nov. 21, 1961 R. L. JAESCHKE ET AL 3,010,039
EDDY-CURRENT COUPLING
Filed April 13, 1959 4 Sheets-Sheet 4

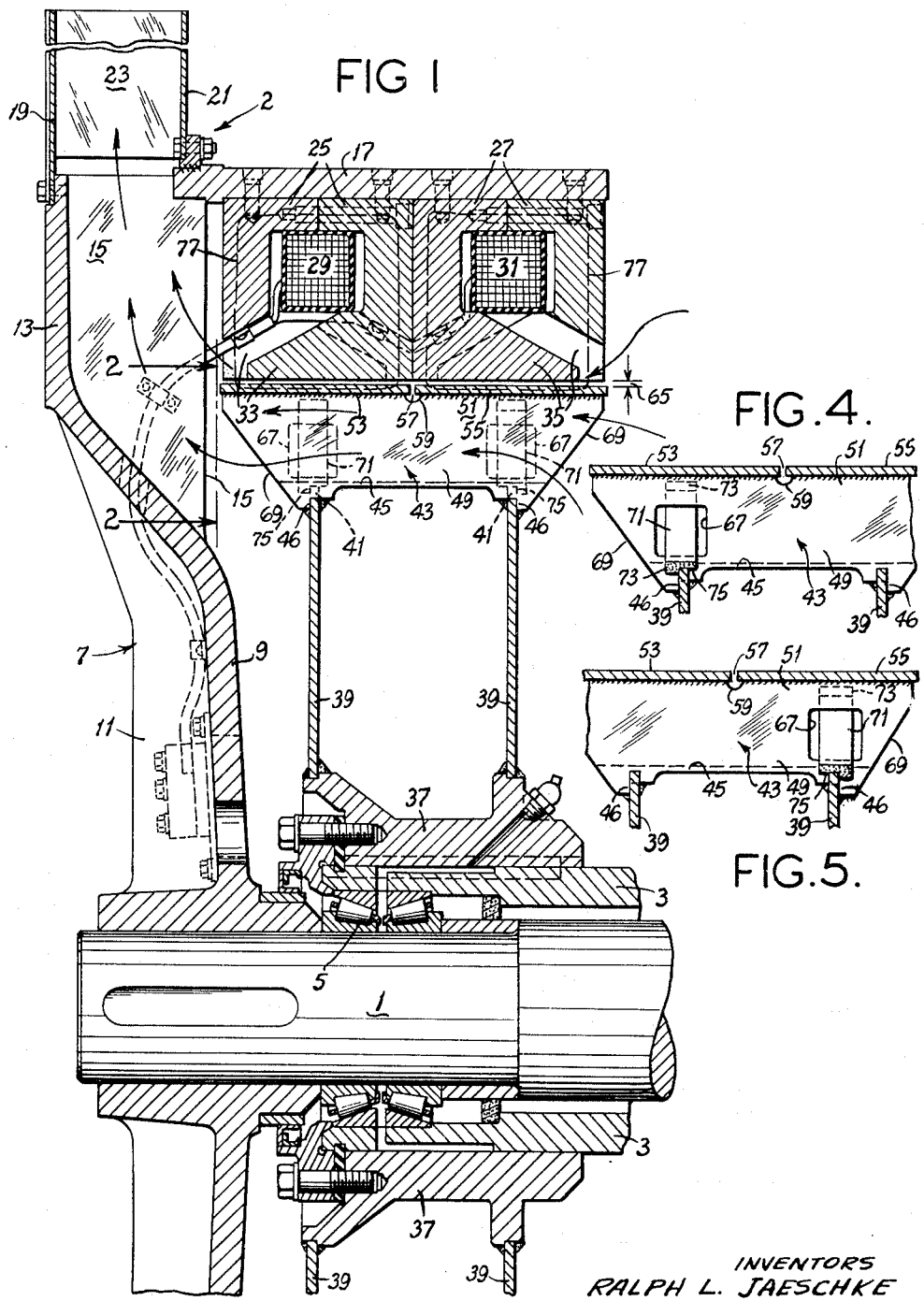

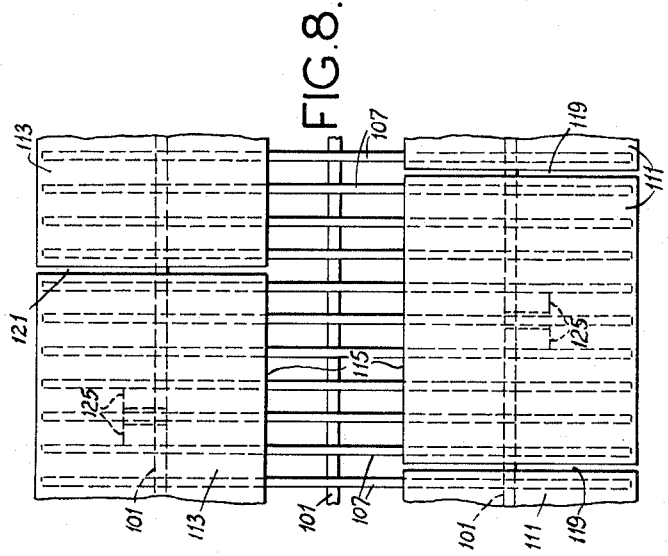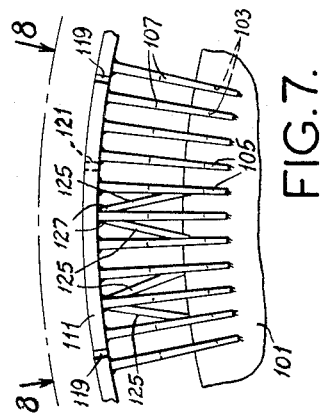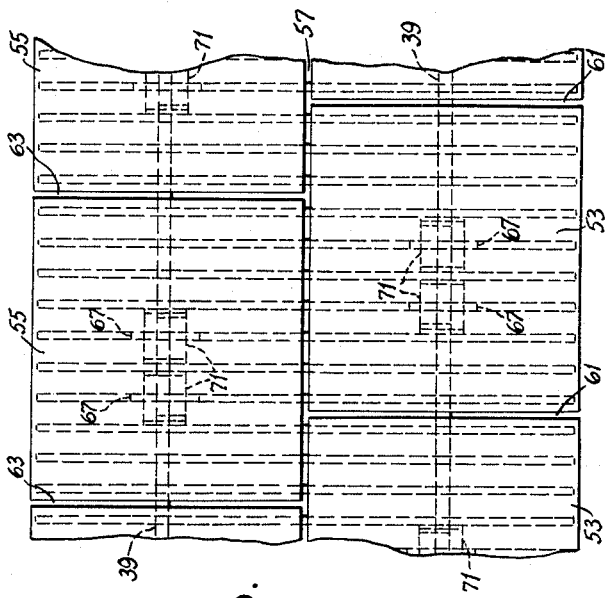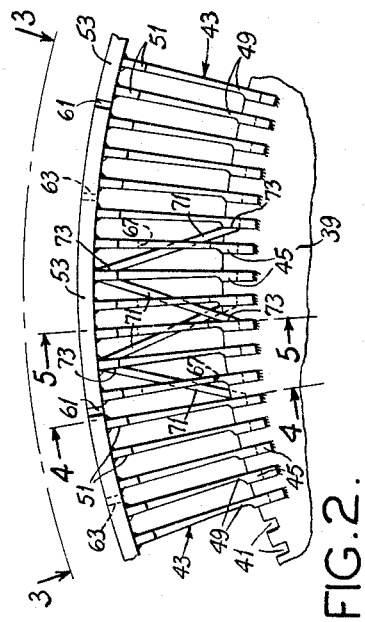

INVENTORS
RALPH L. JAESCHKE
WILLIAM H. MOYER
Koenig and Pope,
Attorneys.

United States Patent Office 3,010,039
Patented Nov. 21, 1961

3,010,039
EDDY-CURRENT COUPLING
Ralph L. Jaeschke and William H. Moyer, Kenosha, Wis., assignors to Eaton Manufacturing Company, Cleveland, Ohio, a corporation of Ohio
Filed Apr. 13, 1959, Ser. No. 805,914
9 Claims. (Cl. 310—105)

This invention relates to eddy-current couplings, and more particularly to such couplings of the air-cooled variety, the invention being an improvement upon structures such as shown in U.S. Patents 2,452,820 and 2,479,989.

Among the several objects of the invention may be noted the provision of an air-cooled eddy-current coupling in which the cooling efficiency is substantially increased, whereby internal distortions are minimized and operating life is increased; the provision of a coupling of the class described in which inductor segments and cooling fins are mechanically organized for greater cooling effects, strength and nonvibratory operation and which also has improved coordinated air-circulating arrangements; and the provision of apparatus of this class which is lighter in weight, although stronger, than comparable prior apparatus. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is an ideal partial axial section of a coupling illustrating one form of the invention;

FIG. 2 is an enlarged fragmentary cross section taken on line 2—2 of FIG. 1, illustrating the mounting of certain inductor segments;

FIG. 3 is a developed plan view of the inductor segments shown in FIG. 2, being viewed on line 3—3 of FIG. 2;

FIG. 4 is a detail section taken on line 4—4 of FIG. 2;

FIG. 5 is a detail section taken on line 5—5 of FIG. 2;

FIG. 7 is an enlarged fragmentary cross section taken on line 7—7 of FIG. 6;

FIG. 8 is a developed plan view of the inductor segments employed in the form of the invention shown in FIG. 6, being viewed on line 8—8 of FIG. 7;

Figure 6:
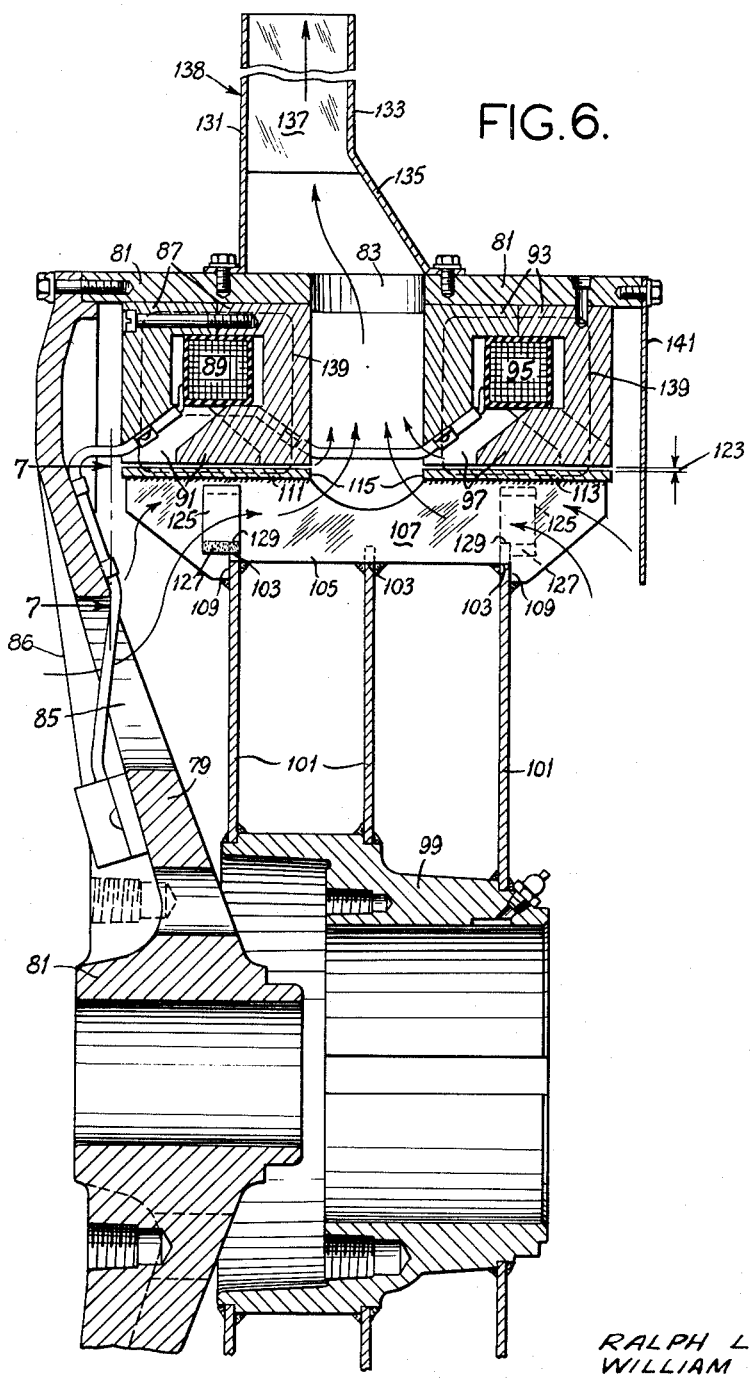
FIG. 6 is a view similar to FIG. 1, showing another form of the invention.

Referring now more particularly to FIGS. 1 and 2, there is shown at numeral 1 a drive shaft and at numeral 3 a driven quill. Between them is located a pilot bearing 5 providing for relative rotation between 1 and 3. Keyed to the shaft 1 is a spider 7 having a central inwardly crowned portion 9 provided with outside radial strengthening webs 11. The rim of the spider is outwardly offset as shown at 13, to provide a large peripheral space occupied by radially disposed fan blades 15. Extending from the rim 13 and blades 15 is an axially disposed steel drum 17.

Annular flat rings 19 and 21 are attached to the rim 13 and drum 17, respectively. Between these rings 19 and 21 are located additional radially extending fan blades 23. The parts 19, 21 and 23 form a centrifugally operative fan ring on the outside of drum 17. The fan ring as a whole is lettered 2.

Supported within the steel drum 17 are pairs of magnetizable pole rings 25 and 27. Annular field coils 29 and 31 are flanked and contained by the pole rings of the respective pairs 25 and 27. The pole rings 25 carry oppositely extending interdigitated magnetizable poles 33. The pole rings 27 also carry oppositely extending interdigitated magnetizable poles 35. As is common practice, the poles 33 and 35 are formed as axially disposed teeth, the peripherally disposed sides of which converge away from their respective pole rings 25 or 27. The inside surfaces of the poles 33 and 35 are cylindrically machined to provide inwardly presented, cylindrically disposed pole faces.

Keyed to the quill 3 is a central hub 37 which, by welding, supports a pair of axially spaced solid discs 39. The discs 39 are oppositely notched as shown at 41, for the reception of a plurality of axially disposed cooling fins 43 which are in the form of more or less rectangular plates beveled at their ends, as shown at 69.

Each fin 43 has a flat relatively thick base portion 45 extending throughout its length. Each base portion 45 is notched within its beveled ends as shown at 46 for reception in the notched portions 41 of the discs 39. The extremes of the notches 46 engage the outside surfaces of the discs 39 so as properly to position the fins 43 axially. The notches 41 in the discs position the fins 43 radially. After the notches 41 and 46 are engaged, the resulting interlocking notches of the fins 43 and discs 39 are welded.

Each fin 43, radially beyond its relatively thick base 45, is formed with a thin portion 49 beyond which the fin increases in thickness up to an outside edge portion 51, the latter portion on each fin being about as thick as the base portion 45 (see FIG. 2). The outermost margins of the edge portions 51 by appropriate machining are circularly disposed for inside engagement with circular conductive and magnetizable inductor segments 53 and 55 of curved-plate form as shown, to which portions 51 are welded. The series of segments 53 lie in one plane and the series of segments 55 lie in an adjacent plane, the respective series being separated by space 57, adjacent notches 59 being supplied in the fins 43 at the space 57 (see FIGS. 1 and 3).

The individual inductor segments 53 and 55 in each series are also separated by axially directed space-forming slots 61 and 63, respectively. These are radially located between fins 43. The groups of slots 61 and 63 are also staggered, each one in a series being offset with respect to those in the adjacent series and offset or out of register relative to a center position in the spacing between a pair of slots of the adjacent series. As a rule, the number of segments 53 or 55 in each of their series must not be divisible by the number of poles 33 or 35, respectively, to produce a whole number. Moreover, the number of segments such as 53 or 55 in one series as compared to the number of adjacent poles such as 33 or 35, respectively, should be relatively small. Thus, for example, twenty-four poles 33 facing twenty-three segments 53 is not as satisfactory as twenty-four poles 33 facing eighteen segments 53. Such a rule avoids excessive vibration such as may be caused by magnetic interlocking effects. As is apparent from FIG. 1, a magnetic gap 65 is located between the outer faces of the segments 53 and 55 and the inner faces of the poles 33 and 35. This should be relatively small, as for example, on the order of ⅛ inch or so.

A convenient manner of making the inductor structure is initially to form the segments 53 and 55 as continuous rings which are telescoped over the array of cooling fins 43 after the latter have been welded to the discs 39 carried on hub 37. Welding between the margins of the circularly disposed fins 43 and these rings is then accomplished. In positioning the rings preparatory to welding, the slot 57 is left. Thereafter the slots 61 and 63 are axially machined into the rings to provide the series of segments 53 and 55. Between these and the bands of poles 33 and 35 is established the magnetic gap 65. The slots 61 and 63 are positioned between pairs of fins 43 so that no weakening of the connections between the fins and the segments occurs during machining. The resulting axial disposition of the slots 61 and 63 does not tend to produce vibrations where, as stated, the poles 33 and 35 have, as is usual, axially converging sides.

As shown in FIGS. 4 and 5 an appropriate number of the fins 43 are individually provided, at one end or the other, with an opening 67. Each opening 67 is adjacent beveled portions 69 of the respective fin. The purpose of each opening 67 is to accept a triangulating brace 71. Each brace is beveled at its opposite ends, as shown at 73, for the purpose of a weldment at opposite ends to adjacent fins 43. At their lower beveled ends the braces 71 are notched as shown at 75 for notched organization with the discs 39.

Operation of the form of the invention shown in FIGS. 1–5 is as follows, assuming shaft 1 to be driven by suitable means and the coils 29 and 31 to be electrically excited through appropriate current collectors in the manner known in the art. Excitation of the coils will result in toroidal flux fields being generated such as shown at 77. These loop around the respective coils. They also interlink the poles 33 and 35 with the inductor segments 53 and 55, respectively. As the poles 33 and 35 are rotated, this interlinkage sets up eddy currents in the segments which, by the production of reactive magnetic fields, cause a driving action upon quill 3 from segments 53, 55, fins 43 and braces 71, discs 39 and keyed hub 37.

The fan blades 15 and 23 draw in air axially primarily between the fins 43, thus cooling the eddy-current-heated segments 53 and 55. Some air is also drawn through the gap 65 and between teeth 33 and 35. The discs 39 block off central movement of air which might by-pass the gap and fins (see the curved darts, FIG. 1). The employment of the fan blades 23 outside of drum 17 insures that a higher velocity of a larger mass of cooling air will be obtained than fan blades 15 are capable of. Also, the cooling effect of the outwardly thickened (inwardly thin) fins 43 exceeds that of comparable fins that may be made flatwise throughout their areas. This is because a large cross section of the fins under the segments 53 and 55 freely carries heat inward by conduction into the thinner areas of the fins, where loss of heat by radiation and convection is rapid. Nevertheless, the normally structurally weaker thinner insides of the fins are strongly organized with the supporting discs 39.

Another form of the invention is shown in FIGS. 6–8, wherein numeral 79 indicates a spider having a hub 81 adapted to be keyed to a suitable drive shaft (not shown). This spider is peripherally attached to an axially disposed steel drum 81 in which is a central band of openings 83 for air exit. In this case the spider 79 also has air-circulating openings 85 therein between webs 86. Within the drum 81, adjacent spider 79, is supported a pair of magnetizable pole rings 87, flanking and supporting an annular coil 89, rings 87 being provided with axially interdigitated poles 91 (such as 33 in FIG. 1). At the other end of the drum 81 to the right of the openings 83 is a second pair of pole rings 93, flanking and supporting an annular coil 95, rings 93 having axially interdigitated poles 97 (such as 35 in FIG. 1). In this case the pole and coil assemblies are widely separated by the openings 83.

At numeral 99 is a hub adapted to be keyed to a driven quill (not shown). Hub 99 supports three welded discs 101 which are peripherally notched as shown at 103. The notches are adapted to receive the thinner inner margins 105 of fins 107. The thinner margins 105 are notched, as shown at 109, adjacent to notches 103 in the outer discs 101. Weldments adjacent to notches 103 hold the fins 107 on the discs 101.

The fins 107 become thicker in an outward direction, where they are marginally welded to two series of inductor segments 111 and 113 which are widely spaced from one another, as shown at 115. Each fin 107 is provided with a large notch 117 providing for the space 115. Spaces or slots between the segments 111 are shown at 119 and spaces or slots between the segments 113 are shown at 121 (FIGS. 7 and 8). These are staggered in the manner decsribed in connection with slots 61 and 63 in FIGS. 1–5. The arrangement in FIGS. 6–8 is such as to provide a magnetic gap, as appears at 123, between the segments 111 and 113 on the one hand and the poles 91 and 97 on the other hand. Bracing for the fins 107 is shown at 125, consisting of double-ended struts welded at opposite beveled ends to adjacent fins, as indicated at 127. In this case no openings are employed within the fins. However, again each brace 125 is notched as shown at 129 for cooperation with the margin of one of the discs 101. The fins 107, discs 101, segments 111, 113 are all suitably welded.

At numeral 131 is shown a radial disc encircling and attached outside of drum 81. At 133 is shown a second ring having a funnel-shaped flared portion as shown at 135. This is also fastened to the drum 81. Radial fan blades 137 are located between the ring portions 131 and 133 for centrifugally moving air, as shown by the curved darts in FIG. 6. The fan ring assembly 131, 133, 135, 137 is generally lettered 138. An air-deflective ring 141 is bolted to the end of drum 81 for directing air for maximum flow through the fins 107 and against the heated segments 111 and 113. A magnetic field surrounds the coils 89 and 95, as shown at 139. The general operation of this form of the invention will be clear from the operation already described in connection with the FIGS. 1–5 form. In particular, it differentiates in that there is a branched flow of air reaching the outer fan ring through a common air passage through openings 83 between the spaced pole and coil assemblies.

In connection with both forms of the invention above described, it will be understood that the poles such as 33, 35, 91 and 97 do not become as hot as the inductor segments such as 53, 55, 111 and 113. It is for this reason that the circuit for the cooling air is arranged such that the largest amount flows across the insides of the inductor segments and through the fins 43 or 107, as the case may be. The thick outer margins of the fins conduct heat rapidly from the segments to the inner thin fin margins for rapid heat transfer from the segments as a whole to the large volume of air flowing in contact with the fins and the segments.

Figure 9:
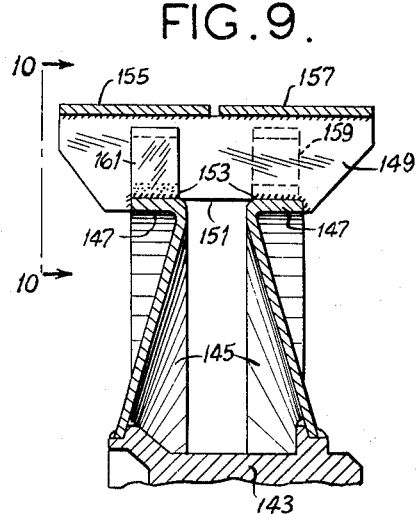
FIG. 9 is a fragmentary axial section illustrating a modification.
Figure 11:
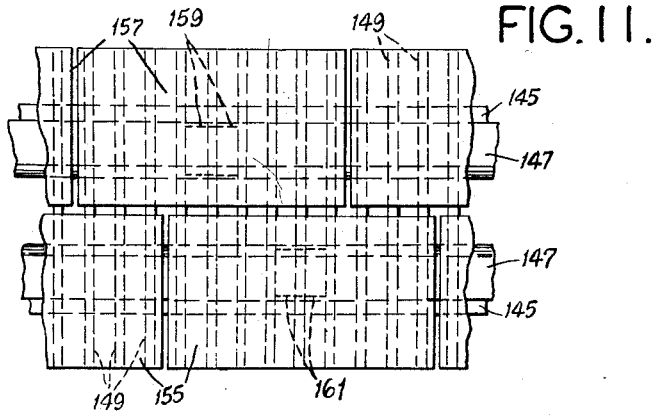
FIG. 11 is a developed plan view of FIG. 10.
Figure 10:
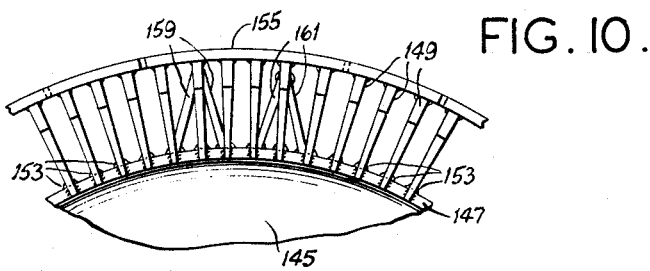
FIG. 10 is an end elevation of FIG. 9 viewed from line 10—10.

FIGS. 9–11 illustrate a modified form of disc and fin assembly adapted for use with pole rings of the type above described. In this case the driven hub is numbered 143, to which dished sheet-metal cones or discs 145 are attached. The hollow portions of these cones face one another. The cones 145 are peripherally flanged in opposite directions, as shown at 147. Cooling fins are shown at 149, being inwardly tapered in the manner already described. These are notched in their thin edges as shown at 151, and welded to the rims 147 as shown at 153. During this welding process, the fins 149 also have welded to them rings of materials for the provision of rows of staggered inductor segments 155 and 157, corresponding to the inductor segments already described. Welded triangulating braces 159 are employed for bracing the fins which support the segments 157. Welded triangulating braces 161 are employed for bracing the fins which support the segments 155. A suitable jig may be employed for radially locating the fins during welding.

The form of the invention shown in FIGS. 9–11 has the same advantages as those already described, with the additional advantage that the flanged cones 145 provide very rigid supports for the fins 149. Also, the lengths of the welds 153 on the rims 147 are substantial, thereby increasing the fin supports.

From the above, it will be seen that the invention provides a very rigid structure for the mountings of the tapered fins. It will be understood that the inward tapers (outward flares) are important to the invention in that, as compared to fins of equal thicknesses throughout, the heat-removing and transferring capacity of the fins is much larger. Couplings made according to the invention have about 25% greater heat dissipation than comparable couplings without the invention. They also effect cooler over-all operation, which reduces distortions of parts and prolongs the operating life of the device. Low distortion is particularly important in respect to the inductor segments adjacent the comparatively small magnetic gaps such as 65 and 123.

Another important feature of the invention is the fan ring externally attached to the outer axial drum. Each fan ring is preferably composed of light-weight sheet metal and, being located on the outside of the respective drum, becomes very effective to produce a strong centrifugal force on the air being handled, without unduly increasing the moment of inertia of the rotary system to which the respective ring is attached.

It will be understood that, although the driving and driven relationship between the rotary assemblies is preferably as described, this may be reversed without affecting the advantages of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An eddy-current coupling comprising a first rotary member supporting a series of circularly disposed poles, a second rotary member, radial disc means carried on said second rotary member, a peripheral series of axially disposed fins attached to the disc means, each fin being constituted by a heat-conductive plate which is marginally relatively thin adjacent its point of attachment with the disc means and which has outwardly flowing sides so as to be thicker along its other margin, and a series of peripherally spaced inductor segments of curved-plate form supported by the thicker margins of said fins in circularly disposed relation closely adjacent the circularly disposed poles.

2. An eddy-current coupling comprising a first rotary member supporting an axially disposed drum, a series of circularly disposed inwardly extending poles on the inside of the drum, a second rotary member, a pair of conically formed disc means carried on said second rotary member, said disc means having axial flanges, a peripheral series of axially disposed fins attached to the flanges of the disc means, each fin being constituted by a heat-conductive plate which is marginally relatively thin adjacent its point of attachment with said axial flanges and which has outwardly flaring sides so as to be thicker along its other margin, and a series of peripherally spaced inductor segments of curved-plate form supported on their concave sides by the thicker margins of said fins, said segments being in circularly disposed relation closely adjacent the insides of the circularly disposed poles.

3. An eddy-current coupling comprising a first rotary member supporting a series of circularly disposed poles, a second rotary member, radial disc means carried on said second rotary member, a peripheral series of axially disposed fins attached to the disc means, each fin being constituted by a heat-conductive plate which is marginally relatively thin adjacent its point of attachment with the disc means and which has outwardly flaring sides so as to be thicker along its other margin, a series of peripherally spaced and curved inductor segments supported by the thicker margins of said fins in circularly disposed relation closely adjacent the circularly disposed poles, triangulating bracing means extending from the connection between at least one fin of each segment and the connection between another fin and the disc means, and at least one additional fin between said one and the other fin having an opening through which said bracing means extends.

4. An eddy-current coupling comprising a first rotary member supporting a drum, bands of inwardly directed magnetic poles carried on the inside of the drum, a second rotary member, a plurality of discs carried on said second rotary member, a series of axial fins supported by the discs, each fin being constituted by an axially disposed plate between the discs, each plate being relatively thin at its points of attachment with the discs and flaring outward to a thicker portion, bands of peripherally spaced inductor segments connected to the outer thicker portions of said fins and positioned inward of said bands of poles respectively, the spaces between segments in one band being staggered relative to the spaces between segments in the other band and being constituted by slots axially located between fins, the slots between segments in one band being out of register with respect to the centers of the spacing between slots in the other band.

5. An eddy-current coupling according to claim 4, including triangular bracing elements extending between the outer thicker portions of at least one fin in each band thereof and one of said discs, and wherein some of the fins are provided with openings through which extend the portions of the triangular bracing.

6. An eddy-current coupling comprising a first rotary member, a drum supported thereon, a band of inwardly directed spaced magnetic poles carried inside of said drum, a second rotary member, several discs on said secondary rotary member, axially extending and radial fins supported marginally upon said discs, each fin flaring outward from a relatively thin margin to a relatively thick margin, the thicker outer margins of said fins supporting a band of peripherally spaced inductor segments, said drum having air outlet means adjacent the band of poles on one side of the discs, said fins forming air inlet means on the other side of the discs for passage of air axially past said fins and segments to said outlet, and an external fan ring extending substantially from the outside of said drum adapted centrifugally to induce a flow of air within said segments between said fins and adjacent the poles.

7. An eddy-current coupling comprising a first rotary member, a drum supported thereby, substantially spaced bands of magnetic poles extending inward from said drum, said drum having outlet openings adjacent to the spacing between bands, a second rotary member, a plurality of discs carried thereby, a plurality of axially directed fins of outwardly flaring form supported by the margins of said discs, substantially spaced bands of inductor segments carried at the opposite end portions of said fins within said pole bands, said outlet openings being adapted for movement of air from opposite ends of said fins toward their central portions and outward between said pole bands and through said drum outlet openings.

8. An eddy-current coupling according to claim 7, including a fan ring having blade carried a substantial distance outside of said drum covering said air outlet means and adapted centrifugally to induce flow of air therethrough.

9. An eddy-current coupling comprising a first rotary member supporting a series of circularly disposed poles, a second rotary member, a pair of radial dished discs carried on said second rotary member with the concave faces of the dished portions facing one another, said discs having oppositely directed marginal flanges extending away from said concave faces, a peripheral series of axially disposed fins attached to said flanges, each fin being constituted by a heat-conductive plate which is marginally relatively thin at and adjacent its point of attachment with said flanges and which is thicker toward its other margin, and bands of peripherally spaced inductor segments supported by the thicker margins of said fins in circularly disposed relation closely adjacent the circularly disposed poles.

References Cited in the file of this patent

UNITED STATES PATENTS

| | | |
|---|---|---|
| 2,479,989 | Winther | Aug. 23, 1949 |
| 2,668,922 | Burdick | Feb. 9, 1954 |
| 2,745,974 | Oetzel | May 15, 1956 |
| 2,827,580 | Jaeschke | Mar. 18, 1958 |

UNITED STATES PATENT OFFICE
CERTIFICATE OF CORRECTION

Patent No. 3,010,039 November 21, 1961

Ralph L. Jaeschke et al.

It is hereby certified that error appears in the above numbered patent requiring correction and that the said Letters Patent should read as corrected below.

Column 5, line 45, for "flowing" read -- flaring --; column 6, line 64, for "blade" read -- blades --.

Signed and sealed this 17th day of April 1962.

(SEAL)
Attest:

ESTON G. JOHNSON

Attesting Officer

DAVID L. LADD
Commissioner of Patents